Patented Apr. 5, 1949

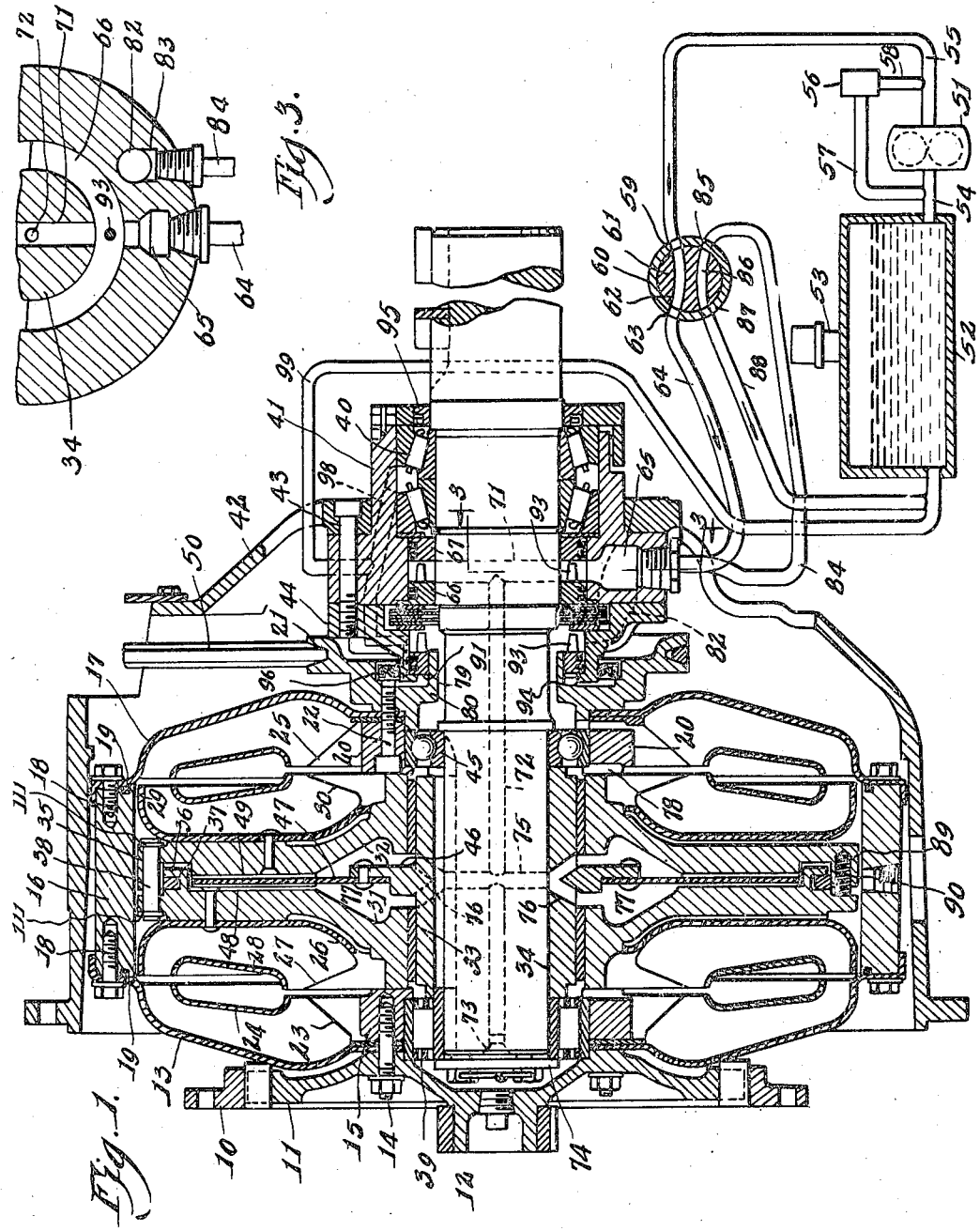

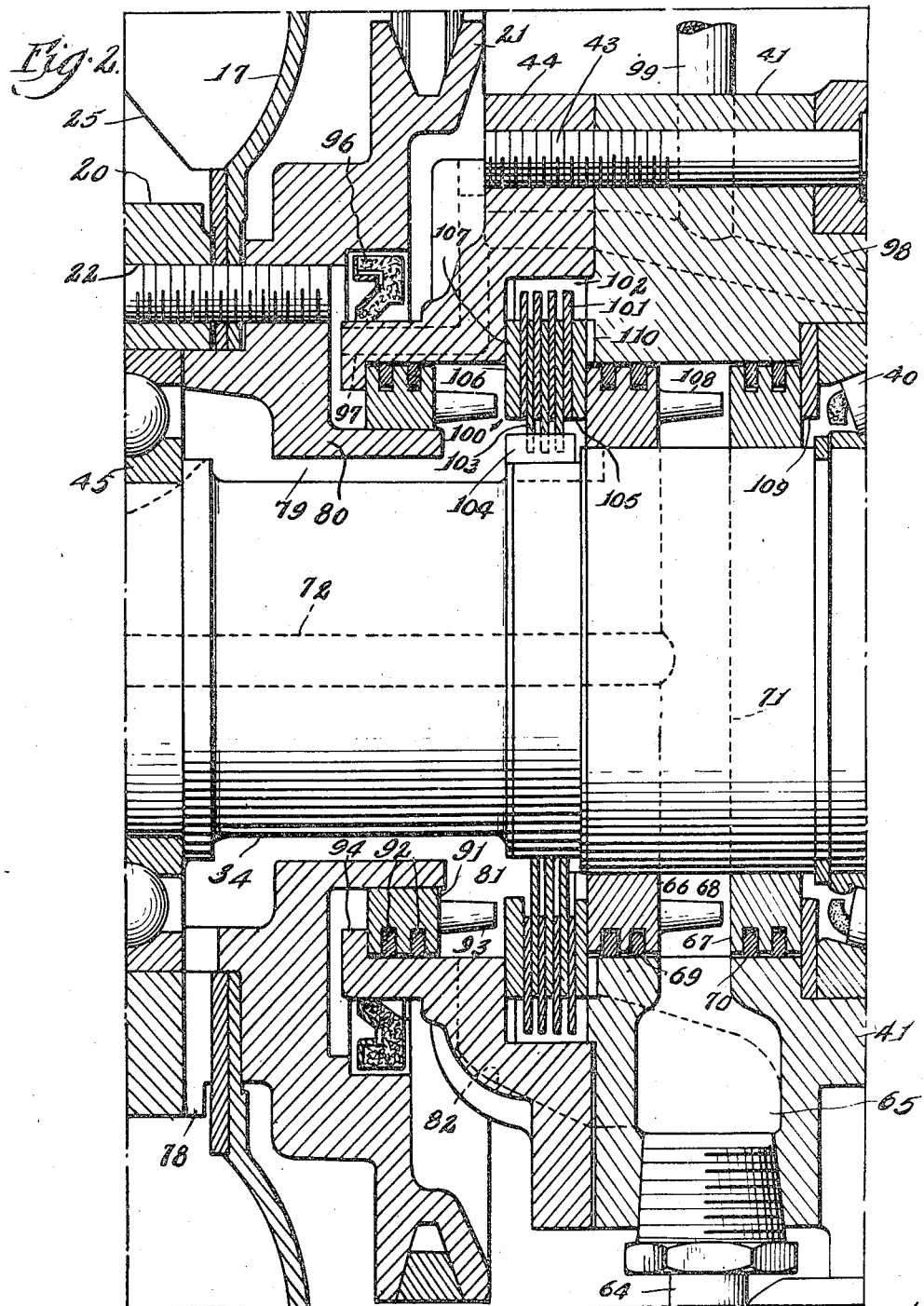

2,466,616

UNITED STATES PATENT OFFICE 2,466,616

HYDRAULIC COUPLING, FRICTION CLUTCH, AND FRICTION BRAKE

Wilbur F. Shurts, Rockford, Ill., assignor to Twin Disc Clutch Company, Racine, Wis., a corporation of Wisconsin Application August 21, 1945, Serial No. 611,745

14 Claims. (Cl. 192—12)

My invention relates to hydraulic couplings and more particularly to a mechanism of this type which incorporates a provision of preventing as desired the application of any torque to the driven shaft regardless of the speed of the engine or other power source.

One operating difficulty frequently encountered with the ordinary hydraulic coupling is the inability to positively interrupt power flow to the driven shaft as may be required by certain types of the connected machinery, for example, where there is a requirement for shifting gears in a transmission. Even at low speeds of the engine and hence of the coupling impeller, there exists a so-called drag torque which is reflected in a creeping of the runner shaft, or a tendency of this nature in the event that the load resistance exceeds this torque. The customary solution for this problem takes the form of an auxiliary friction clutch in the drive train externally of the coupling, and as a specifically different solution, there is disclosed in United States Letters Patent No. 2,250,885, dated July 29, 1941, a coupling incorporating a friction clutch as an integral part thereof and which is mechanically engaged and disengaged.

A further solution is disclosed in United States Letters Patent No. 2,400,093, dated May 14, 1946, wherein the coupling is provided with friction devices which are hydraulically engaged to positively transmit power and hydraulically disengaged to interrupt substantial power flow through the coupling, the liquid employed for this purpose being the working liquid of the coupling under suitable pressure. With this arrangement, there may exist a small drag torque on the driven shaft occasioned by the bearing drag of the coupling runners and where the conditions of operation require a definite stoppage of the driven shaft, any torque, however small, is objectionable.

It is therefore one object of the invention to provide a hydraulic coupling having friction devices which are hydraulically engaged and disengaged to respectively transmit and interrupt power flow through the coupling and a braking device arranged as an integral part of the coupling and adapted to stop creeping of the driven shaft occasioned by bearing drag torque exerted by the coupling runners.

A further object is to provide a coupling of the constantly filled type in which the engaging and disengaging forces for the friction and braking devices are furnished by the application of pressure to the coupling liquid.

These and further objects of my invention will be set forth in the following specification, reference being had to the accompanying drawings, and the novel means by which said objects are effectuated will be definitely pointed out in the claims.

In the drawings:

Fig. 1 is a sectional elevation of the coupling showing the same in non-power transmitting condition and including a schematic layout of the system for controlling the application of pressure to the coupling liquid.

Fig. 2 is an enlarged, fragmentary, sectional elevation showing the brake for positively holding the driven shaft against rotation when the coupling is conditioned to interrupt power flow.

Fig. 3 is a section along the line 3—3 in Fig. 1 showing a structural detail.

Referring to Fig. 1 of the drawings, the numeral 10 designates an internally toothed, driving ring which may be bolted to an engine flywheel, or other source of power, and which meshes with an externally toothed, driven disk 11 having a hollow hub 12 that is coaxial with and preferably piloted in the flywheel. The inner rim of an impeller 13 is clamped by means of studs 14 between the disk 11 and a stop ring 15 located inwardly of the impeller and the outer rim is shaped to receive one end of a spacer ring 16 whose opposite end is received within the correspondingly shaped outer rim of an impeller 17 that is positioned in facing relation to the impeller 13. A plurality of circumferentially spaced cap screws 18 threaded in the spacer ring 16 secure the impellers together and leakage of the working liquid, usually an appropriate oil, in this locality is prevented by packing 19—19 between the ends of the ring 16 and the adjacent portions of the impeller rims. The inner rim of the impeller 17 is clamped between a stop ring 20 located inwardly of the impeller and a pulley 21 by means of a plurality of cap screws 22. The impeller 13 is provided with a plurality of radial blades 23 and a shroud ring 24, thus defining a plurality of radial liquid passages. Similarly positioned and secured blades 25 are arranged around the impeller 17 to form like liquid passages.

A runner 26 having a plurality of radial blades 27 defining therewith and a shroud ring 28 a plurality of radial, liquid passages is located in facing and cooperating relation to the impeller 13 and a similar runner 29 having blades 30 and like radial, liquid passages is positioned in facing and cooperating relation to the impeller 17, thus forming a pair of liquid working circuits.

From the foregong, it will be understood that the runners 26 and 29 constitute the inner shells of their respective working circuits, while the outer shells are formed by the impellers 13 and 17. However, power flow through the coupling may be reversed without affecting its operability and, in this event, the runners 26 and 29 act as impellers and the impellers 13 and 17 serve as runners.

The runners 26 and 29 are respectively carried by pressure plates 31 and 32 which are freely journaled on a hub 33 keyed to a driven shaft 34. An annular flange 35 is provided on the periphery of the plate 32 which overlies an annular boss 36 on the plate 31 and a piston ring 37 seated in a groove in the plate 31 provides sealing contact with the inner surface of the flange 35 so that the space between the plates 31 and 32 is substantially oil tight and pressure may be established therein for a purpose presently explained. As a means of insuring that the plates 31 and 32 and the associated runners will rotate together to thus maintain the effectiveness of the piston ring seal, a plurality of circumferentially spaced pins 38 extend through the flange 35 and the peripheral portion of the plate 31.

One end of the shaft 34 is piloted in a bearing 39 carried within the stop ring 15 and the opposite end is journaled in a bearing 40 carried by a ring 41 to whose outer face is secured the inner periphery of a housing 42 by cap screws 43. A ring 44 is secured by the same cap screws to the inner face of the ring 41 and functions as a stationary part of a clutch brake presently described. The ring 41 substantially constitutes a hub in which the shaft 34 is journaled. The housing 42 encloses the coupling and may be attached to the engine flywheel housing or otherwise supported. An intermediate bearing 45 is carried by the shaft 34 and its outer race is in supporting relation to the stop ring 20.

Since the pressure plates 31 and 32 and their associated runners are freely journaled on the driven shaft 34, it is necessary to provide a releasable mechanical connection between the plates 31 and 32 and the shaft such that the power connection through the coupling to the shaft can be positively completed or broken and, when interrupted, the principal engine torque will not be exerted on the shaft.

For this purpose, the hub 33 incorporates an annular flange 46 centrally disposed between the pressure plates 31 and 32 which has secured thereto a clutch plate 47. This plate is located between the plates 31 and 32 and has secured to its opposite surfaces the usual friction facings which are disposed in coacting relation to annular faces 48 and 49 provided, respectively, on the pressure plates 31 and 32. Hence, when these plates are shifted towards each other as presently explained, the plate 47 is gripped between the pressure plates to establish a final, friction clutch connection with the shaft 34. Generally speaking, the pressure plates 31 and 32 are hydraulically moved towards and away from each other to establish and break the power connection, respectively, by suitably applying a pressure to the coupling liquid.

The pulley 21 is drivably connected by a belt 50 to an oil pump 51 that may be of the characteristic spur gear type and is only shown diagrammatically in Fig. 1. Since the pump is thus positively connected to the impellers 13 and 17, it is capable of delivering pressure whenever the impellers rotate and, during periods of power transmission, this pressure is transmitted to the liquid circuits of the coupling to thus shift the plates 31 and 32 to positions in which they grip terrupt the power flow, the pump pressure is shifted to the annular space between the plates 31 and 32 to thus separate them from contact with the clutch plate 47, the latter position being shown in Fig. 1. The coupling is always filled with oil during operation and the pressure shifts are accomplished by an external system of control which will now be described.

A reserve oil tank 52 (see Fig. 1) is carried in any desired manner (not shown) by the housing 42 and is provided with a breather pipe 53 whereby the oil in the tank is always subjected to atmospheric pressure. A suction line 54 leads from the tank to the pump 51 whose discharge is conducted through a line 55 which may include a filter (not shown). In order to prevent the building up of excessive pressures in the unit, the pump 51 is preferably associated with a pressure relief valve 56 of standard construction. The valve is connected to the lines 54 and 55 by lines 57 and 58, respectively, whereby when the pressure in the line 55 exceeds a predetermined value, the valve 56 opens to bypass a portion or all of the oil through the lines 58 and 57. The line 55 connects with a port 59 provided in the casing of a four-way valve 60 having a rotor 61. The rotor 61 is provided with a passage 62 which connects the port 59 with a port 63 in the valve casing when the rotor occupies the position shown in Fig. 1. A line 64 connects the port 63 with a radial passage 65 formed in the ring 41. The ring 41 is spaced from the shaft 34 and this annular zone is occupied by carrier rings 66 and 67 (see Figs. 1 and 2) which fit the shaft and are spaced to define therebetween an annular channel 68 which always registers with the passage 65. The outer surfaces of the rings 66 and 67 are grooved to receive a plurality of piston rings 69 and 70, respectively, which have sealing contact with the inner surface of the ring 41. Therefore, any pressure existing in the passage 65 is exerted axially of the clutch against the carrier rings 66 and 67 and this arrangement is availed of in a manner presently explained.

The channel 68 provides communication between the passage 65 and a passage 71 that extends diametral of the shaft 34 and the latter passage in turn communicates with an axial passage 72 in and which extends to the left end of the shaft, as viewed in Fig. 1, where it is closed by a plug 73. Also secured to the same end of the shaft 34 is a plate 74 which clamps the inner race of the bearing 39 against the hub 33. A diametral passage 75 in the shaft 34 connects the axial passage 72 with divergent passages 76 in the hub 33 which in turn communicate with an annular space 77 between the pressure plates 31 and 32 on both sides of the clutch plate 47.

It will therefore be understood that when the valve rotor 61 occupies the position shown in Fig. 1, the pressure of the pump 51 is applied directly to the space 77, thus maintaining the pressure plates 31 and 32 in the disengaged position shown. The separating movements of the plates are limited by the stop rings 15 and 20 and by the snap rings 111 on the ends of each pin 38.

During the above period of operation, the working circuits of the coupling are filled with oil, but this oil is not under pressure. These circuits then communicate through slots 78 in the stop ring 20 and through the bearing 45 with an annular passage 79 formed between the shaft 34 and a sleeve 80 spaced therefrom and constituting a part of the pulley 21. The right end of the sleeve 80 is spaced from the adjacent end of the carrier ring 66 to thus form an annular passage 81 that is always in communication with a passage 82 which extends outwardly and diagonally through the rings 44 and 41 for connection with a radial passage 83 which is spaced circumferentially from the radial passage 65 (see Fig. 3).

The passage 83 connects by way of a line 84 with a port 85 (see Fig. 1) in the casing of the valve 60. The valve rotor 61 is provided with a second passage 86 which, in the positions of the parts shown in Fig. 1, connects the port 85 with a port 87 also in the valve casing and the latter port is connected to the tank 52 by a line 88. Hence, when the pressure plates 31 and 32 occupy the positions shown in Fig. 1, the liquid circuits of the coupling are not subjected to any pressure since they then communicate with the tank 52 whose position is such that it is incapable of exercising any pressure on the liquid in the circuits, while the other portions of the liquid system are subjected to the relatively higher pressure established by the pump 51.

To engage the friction elements of the coupling and establish power flow through the coupling, the valve rotor 61 is rocked clockwise as viewed in Fig. 1 to a position in which the passage 62 connects the ports 59 and 85 and the passage 86 connects the ports 63 and 87. Pump pressure is then effective in the line 84 and the connecting passages above referred to and hence in the liquid circuits of the coupling, while the pressure in the space 77 drops to zero gage since it then communicates with the tank 52. Accordingly, the pressure plates 31 and 32 are shifted towards each other to drivingly grip the clutch plate 47.

It may be desirable to provide an added separating factor for the pressure plates of the coupling. For example, where the coupling is out of service for such a length of time that the oil cools and contracts, the coupling is then not completely filled. Hence, when the coupling is again placed in operation, there will be a period of time when the pump 51 is filling the coupling and, during this phase, the pressure within the unit is of low magnitude. As the engine accelerates, the inherent hydraulic thrusts of the coupling circuits may tend to or may actually engage the clutch at a time when power is not desired in the driven machinery. If this situation does arise, it may be remedied by providing a plurality of circumferentially spaced sockets 89 (see Fig. 1) in the flange 35 and mounting in each of the sockets a helical spring 90 which seats on the base of the associated socket and exerts pressure against the adjacent portion of the plate 31 for the purpose of positively disengaging the pressure plates 31 and 32. These springs may also be necessary where the coupling is emptied when not in use.

In addition to the carrier rings 66 and 67 and their associated piston ring seals 69 and 70, leakage control is exercised by a third carrier ring 91 which externally fits the sleeve 80 to the left of the passage 81, as viewed in Fig. 2, and which is provided with a plurality of piston rings 92 which have sealing contact with the adjacent, inner surface of the ring 44. The ring 91 includes one or more projections 93 extending laterally from the right end thereof into the passage 81 to prevent closing of this passage by an inadvertent shifting of the ring 91, the projections having limiting engagement with parts of a clutch brake presently described and the opposite end of the ring abutting a shoulder 94 provided on the ring 44. Any oil that may leak past the piston ring seals is retained within the unit by standard type shaft seals 95 and 96 interposed, respectively, between the shaft 34 and the outer end of the ring 41, and between an inner, annular surface provided on the pulley 21 and a cooperating surface formed on the ring 44, and is collected in passages 97 and 98 in the rings 44 and 41, respectively, for delivery to a drain line 99 and gravity return to the tank 52. For convenience of disclosure, the drain line 99 is shown connected to the upper portion of the ring 41, but it will be understood that this connection is preferably made at a lower elevation.

The pump 51 possesses sufficient capacity to compensate for any leakage past the journal bearings of the pressure plates 31 and 32 and also past the piston ring seal 37 between the pressure plates so that adequate pressure is always available to shift these plates into and out of engaging positions.

It has been ascertained that even when the pressure plates 31 and 32 are disengaged from the clutch plate 47 and the engine is running, the shaft 34 may creep slowly due to the journal friction or so-called drag torque between the plates 31 and 32 and the hub 33. This condition may exist under speeds as low as idling speeds of the engine and is objectionable where operative requirements dictate an absolute stoppage of the driven shaft when the main power flow through the coupling is interrupted. In the present arrangement, this problem is solved by a hydraulically actuated, clutch brake whose engaged and disengaged positions are automatically synchronized with the disengaged and engaged positions, respectively, of the pressure plates 31 and 32.

The clutch brake is indicated by the numeral 100 in Fig. 2 and is shown in engaged position. It comprises a plurality of friction disks 101 whose peripheries are notched in the usual manner for constant engagement with teeth 102 extending inwardly from a portion of the ring 44. Since this ring is always stationary, the disks 101 are always held against rotary movement. The disks 101 are alternately and cooperatively arranged with respect to similar disks 103 that are internally notched for constant engagement with teeth 104 on the shaft 34. The brake is held in the engaged position shown by hydraulic pressure in the channel 68 acting against the carrier ring 66 which is thus caused to bear against a clamping plate 105 axially slidable on the teeth 102 and which grips the disks 101 and 103 against a plate 106. The latter plate is also slidable on the teeth 102, and in the position shown, abuts a radial shoulder 107 on the stationary ring 44. The brake 100 is automatically engaged whenever the pressure plates 31 and 32 are disengaged from the clutch plate 47 and by the same hydraulic pressure. Accordingly, the shaft 34 is absolutely prevented from rotating during such periods.

When the valve rotor 61 is turned as above stated to establish pressure in the coupling circuits and to clamp the pressure plates 31 and 32 against the clutch plate 47, pressure in the channel 68 drops to that of the atmosphere. However, the coupling circuit pressure is active in the passage 81 and therefore against the plate 106 and, through the openings in the friction disks 103 occasioned by loose fitting on the teeth 104, also against the adjacent end of the carrier ring

66. The latter accordingly is moved towards the right, as viewed in Fig. 2, to disengage the brake 100. The latter movement of the ring 66 is limited by one or more projections 108 carried thereby which, after the ring has moved sufficiently, abuts the carrier ring 67 that is held against movement in the same direction by contact with a ring 109. The projections 108 insure that the ring 66 will never mask the inner end of the passage 65 and the ring 41 is recessed at 110 to accommodate the releasing movement of the plate 105.

I claim:

1. In a hydraulic coupling, the combination of an impeller, a shaft coaxial with the impeller, a member freely journaled on the shaft, one side of the member being arranged for runner cooperation with the impeller to form a liquid working circuit and the opposite side having a friction face and the member constituting an axially shiftable wall of a chamber separate from the circuit, a clutch plate drivably connected to the shaft for engaging the friction face, means operable between positions directing liquid under pressure to the circuit to engage the member with the plate and to the chamber to disengage the member, and brake means actuated by the liquid pressure which disengages the member for holding the shaft against the bearing drag torque exerted by the disengaged member.

2. In a hydraulic coupling, the combination of an impeller, a shaft coaxial with the impeller, a member freely journaled on the shaft, one side of the member being arranged for runner cooperation with the impeller to form a liquid working circuit and the opposite side having a friction face and the member constituting an axially shiftable wall of a chamber separate from the circuit, a clutch plate drivably connected to the shaft for engaging the friction face, hydraulically actuated, brake means for resisting bearing drag torque of the member on the shaft when disengaged from the plate, and means operable between positions directing liquid under pressure to the circuit to engage the member with the plate, and to the brake means to stop the shaft and to the chamber to disengage the member.

3. In a hydraulic coupling, the combination of an impeller, a shaft coaxial with the impeller, a member freely journaled on the shaft, one side of the member being arranged for runner cooperation with the impeller to form a liquid working circuit and the opposite side having a friction face and the member constituting an axially shiftable wall of a chamber separate from the circuit, a clutch plate drivably connected to the shaft for engaging the friction face, hydraulically actuated, brake means for resisting bearing drag torque of the member on the shaft when disengaged from the plate, and means operable between positions directing liquid under pressure to the circuit to engage the member with the plate, and simultaneously to the brake means to stop the shaft and to the chamber to disengage the member.

4. In a hydraulic coupling, the combination of a pair of members cooperatively related to form a liquid working circuit, a shaft coaxial with the members, one of the members being freely journaled on the shaft and constituting an axially shiftable wall of a chamber separate from the circuit, clutch means secured to the shaft for engaging the freely journaled member, hydraulically actuated, brake means for resisting bearing drag torque of the freely journaled member on the shaft when disengaged from the clutch means, and means operable between positions directing liquid under pressure to the circuit to engage the member with the clutch means, and to the brake means to stop the shaft and to the chamber to disengage the member.

5. A hydraulic coupling comprising a pair of axially spaced and connected impellers located in facing relation, a shaft coaxial with the impellers, a pair of axially shiftable runners freely journaled on the shaft end and forming with the impellers a pair of liquid working circuits, the runners enclosing a chamber separate from the circuits and each runner having an annular friction face exposed within the chamber, a friction clutch plate drivably connected to the shaft within the chamber for engaging the friction faces, hydraulically actuated, brake means for resisting bearing drag torque of the runners on the shaft when disengaged from the plate, and means operable between positions directing liquid under pressure to the circuits to engage the runners with the plate, and to the brake means to stop the shaft and to the chamber to disengage the runners.

6. A hydraulic coupling comprising a pair of axially spaced and connected impellers located in facing relation, a shaft coaxial with the impellers, a pair of axially shiftable runners freely journaled on the shaft and forming with the impellers a pair of liquid working circuits, the runners enclosing a chamber separate from the circuits and each runner having an annular friction face exposed within the chamber, a friction clutch plate drivably connected to the shaft within the chamber for engaging the friction faces, hydraulically actuated, brake means for resisting bearing drag torque of the runners on the shaft when disengaged from the plate, and means operable between positions directing liquid under pressure to the circuits to engage the runners with the plate, and simultaneously to the brake means to stop the shaft and to the chamber to disengage the runners.

7. A hydraulic coupling comprising a pair of axially spaced and connected impellers located in facing relation, a shaft coaxial with the impellers, a hub in which the shaft is journaled, a pair of axially shiftable runners freely journaled on the shaft and forming with the impellers a pair of liquid working circuits, the runners enclosing a chamber separate from the circuits, clutch means secured to the shaft within the chamber for engaging the runners, hydraulically actuated, brake means for resisting bearing drag torque of the runners on the shaft when disengaged from the clutch means, passage means in the shaft and hub for connecting the chamber and brake means with a source of liquid under pressure and other passage means in the hub for connecting the circuits and brake means with said source, and means operable between positions directing the liquid under pressure to the chamber to disengage the runners from the clutch means and to the brake means to stop the shaft, and to the circuits to engage the runners with the clutch means and to the brake means to release the same.

8. A hydraulic coupling comprising a pair of axially spaced and connected impellers located in facing relation, a shaft coaxial with the impellers, a hub in which the shaft is journaled, a pair of axially shiftable runners freely journaled on the shaft and forming with the impellers a pair of liquid working circuits, the runners enclosing a chamber separate from the circuits, clutch means secured to the shaft within the chamber for engaging the runners, hydraulically actuated, brake means having parts respectively carried by the hub and shaft and cooperable for resisting bearing drag torque of the runners on the shaft when disengaged from the clutch means, passage means in the shaft and hub for connecting the chamber and brake means with a source of liquid under pressure and other passage means in the hub for connecting the circuits and brake means with said source, and means operable between positions directing the liquid under pressure to the chamber to disengage the runners from the clutch means and to the brake means to stop the shaft, and to the circuits to engage the runners with the clutch means and to the brake means to release the same.

9. A hydraulic coupling comprising a pair of axially spaced and connected impellers located in facing relation, a shaft coaxial with the impellers, a hub in which the shaft is journaled, a pair of axially shiftable runners freely journaled on the shaft and forming with the impellers a pair of liquid working circuits, the runners enclosing a chamber separate from the circuits, clutch means secured to the shaft within the chamber for engaging the runners, hydraulically actuated, brake means for resisting bearing drag torque of the runners on the shaft when disengaged from the clutch means, passage means in the shaft and hub for connecting the chamber and brake means with a source of liquid under pressure and other passage means in the hub for connecting the circuits and brake means with said source, and means operable between positions directing the liquid under pressure simultaneously to the chamber to disengage the runners from the clutch means and to the brake means to stop the shaft, and to the circuits to engage the runners with the clutch means and to the brake means to release the same.

10. In a hydraulic coupling, the combination of an impeller, a shaft coaxial with the impeller, a hub in which the shaft is journaled, a member freely journaled on the shaft, one side of the member being arranged for runner cooperation with the impeller to form a liquid working circuit and the opposite side having a friction face and the member constituting an axially shiftable wall of a chamber separate from the circuit, a clutch plate drivably connected to the shaft for engaging the friction face, hydraulically actuated, brake means for resisting bearing drag torque of the member on the shaft when disengaged from the clutch plate, passage means in the shaft and hub for connecting the chamber and brake means with a source of liquid under pressure and other passage means in the hub for connecting the circuit and brake means with said source, and means operable between positions directing liquid under pressure to the chamber to disengage the member from the clutch plate and to the brake means to stop the shaft, and to the circuit to engage the member with the clutch plate and to the brake means to release the same.

11. In a hydraulic coupling, the combination of an impeller, a shaft coaxial with the impeller, a hub in which the shaft is journaled, a member freely journaled on the shaft, one side of the member being arranged for runner cooperation with the impeller to form a liquid working circuit and the opposite side having a friction face and the member constituting an axially shiftable wall of a chamber separate from the circuit, a clutch plate drivably connected to the shaft for engaging the friction face, hydraulically actuated, brake means having parts respectively carried by the hub and shaft and cooperable for resisting bearing drag torque of the member on the shaft when disengaged from the clutch plate, passage means in the shaft and hub for connecting the chamber and brake means with a source of liquid under pressure and other passage means in the hub for connecting the circuit and brake means with said source, and means operable between positions directing liquid under pressure to the chamber to disengage the member from the clutch plate and to the brake means to stop the shaft, and to the circuit to engage the member with the clutch plate and to the brake means to release the same.

12. In a hydraulic coupling, the combination of an impeller, a shaft coaxial with the impeller, a member freely journaled on the shaft, one side of the member being arranged for runner cooperation with the impeller to form a liquid working circuit and the opposite side having a friction face and the member constituting an axially and hydraulically shiftable wall of a chamber separate from the circuit, a clutch plate drivably connected to the shaft for engaging the friction face, and hydraulically actuated, brake means for resisting bearing drag torque of the member on the shaft when disengaged from the plate, said brake means being hydraulically disengaged and engaged simultaneously with the engagement and disengagement, respectively, of the clutch plate with the friction face.

13. In a hydraulic coupling having a pair of members cooperably related to form a liquid working circuit wherein one of the members is hydraulically shifted into and out of engagement with a clutch plate keyed to a shaft, brake means for stopping the shaft when said one member is disengaged from the plate, and means for hydraulically actuating the brake means to stopping position and to release position when said one member is disengaged and engaged, respectively.

14. In a hydraulic coupling having a pair of members cooperably related to form a liquid working circuit, a shaft coaxial with the members and a hub in which the shaft is journaled wherein one of the members is hydraulically shifted into and out of engagement with a clutch plate keyed to the shaft, brake means for stopping the shaft when said one member is disengaged comprising parts respectively carried by the hub and shaft, and means for hydraulically actuating the brake means to stopping position and to release position when said one member is disengaged and engaged, respectively.

WILBUR F. SHURTS.

REFERENCES CITED

The following references are of record in the file of this patent:

UNITED STATES PATENTS

| Number | Name | Date |
|---|---|---|
| 1,566,111 | Miller | Dec. 15, 1925 |
| 2,073,357 | Wemp | Mar. 9, 1937 |
| 2,250,885 | Batten | July 29, 1941 |
| 2,400,093 | Batten | May 14, 1946 |
| 2,402,052 | Johansen | June 11, 1946 |